United States Patent
Lee

(10) Patent No.: US 12,282,685 B2
(45) Date of Patent: Apr. 22, 2025

(54) COMPUTATIONAL STORAGE DEVICE, METHOD FOR OPERATING THE COMPUTATIONAL STORAGE DEVICE AND METHOD FOR OPERATING HOST DEVICE

(71) Applicant: SAMSUNG ELECTRONICS CO., LTD., Suwon-si (KR)

(72) Inventor: Jong Won Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/131,446

(22) Filed: Apr. 6, 2023

(65) Prior Publication Data

US 2024/0134568 A1 Apr. 25, 2024
US 2024/0231687 A9 Jul. 11, 2024

(30) Foreign Application Priority Data

Oct. 24, 2022 (KR) .......................... 10-2022-0137423

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC .... G06F 3/0659; G06F 3/0611; G06F 3/0679; G06F 3/0653; G06F 3/0662; G06F 3/0658; G06F 12/1081
USPC ........................................................ 711/154
See application file for complete search history.

(56) References Cited

U.S. PATENT DOCUMENTS

| | | |
|---|---|---|
| 9,864,636 B1 | 1/2018 | Patel et al. |
| 10,120,724 B2 | 11/2018 | Badjatia et al. |
| 10,146,444 B2 | 12/2018 | Kachare et al. |
| 10,528,268 B2 | 1/2020 | Seo et al. |
| 10,929,025 B2 | 2/2021 | Shaw |
| 11,016,679 B2 | 5/2021 | Secatch et al. |
| 11,074,011 B2 | 7/2021 | Muthiah |
| 2018/0095675 A1* | 4/2018 | Kachare ................ G06F 3/0688 |
| 2019/0361630 A1 | 11/2019 | Frolikov |
| 2024/0094950 A1* | 3/2024 | Benisty ................ G06F 3/0679 |

FOREIGN PATENT DOCUMENTS

JP 2017091330 A 5/2017

OTHER PUBLICATIONS

European Search Report in European Appln. No. 23182401.2, mailed on Mar. 14, 2024, 4 pages.
Office Action in European Appln. No. 23182401.2, mailed on Mar. 26, 2024, 11 pages.

* cited by examiner

*Primary Examiner* — Hua J Song
(74) *Attorney, Agent, or Firm* — Fish & Richardson P.C.

(57) ABSTRACT

A method for operating a computational storage device includes receiving by a storage controller and from a host device: (1) a compute namespace setting instruction instructing the setting of a compute namespace; (2) a latency threshold value related to the compute namespace; (3) a program; (4) a first execute command using the program; and (5) a second execute command using the program. Additionally, the method includes transmitting, by the storage controller and to the host device, a latency message in response to the second execute command.

18 Claims, 15 Drawing Sheets

COMPUTATIONAL STORAGE DEVICE, METHOD FOR OPERATING THE COMPUTATIONAL STORAGE DEVICE AND METHOD FOR OPERATING HOST DEVICE

CROSS-REFERENCE TO RELATED APPLICATION

This application claims priority from Korean Patent Application No. 10-2022-0137423 filed on Oct. 24, 2022, in the Korean Intellectual Property Office, and all the benefits accruing therefrom under 35 U.S.C. 119, the contents of which in their entirety are herein incorporated by reference.

BACKGROUND

Field

The present disclosure relates to a computational storage device, a method for operating the computational storage device, and a method for operating a host device.

Description of Related Art

Semiconductor memory devices include volatile memory devices and non-volatile memory devices. While read and write speeds of the volatile memory device are high, the volatile memory device may lose stored contents when the volatile memory device is powered off. Conversely, the non-volatile memory device keeps stored contents therein even when power thereof is turned off. Thus, the non-volatile memory device is used to store contents to be kept regardless of whether the power is supplied or not.

For example, the volatile memory device includes a static RAM (SRAM), a dynamic RAM (DRAM), and a synchronous DRAM (SDRAM). The non-volatile memory device keeps therein stored contents even when the device is power-off. For example, the non-volatile memory device includes ROM (read only memory), programmable ROM (PROM), EPROM (electrically programmable ROM), electrically erasable and programmable ROM (EEPROM), flash memory, phase change RAM (PRAM), magnetic RAM (MRAM), resistive RAM (RRAM), ferroelectric RAM (FRAM), etc. The flash memory may be classified into a NOR type flash memory and a NAND type flash memory.

Recently, attempts have been made to combine a processor and an accelerator with each other to improve a processing speed of an electronic device. These attempts are being made across various fields. In particular, even for a large-capacity storage device, such as an SSD (solid state drive), a lot of research on a computational storage device having an accelerator-based platform is being conducted.

SUMMARY

A purpose of the present disclosure is to provide a computational storage device capable of latency control related to computing execution, a method for operating the device, and a method for operating a host device.

Purposes according to the present disclosure are not limited to the above-mentioned purpose. Other purposes and advantages according to the present disclosure that are not mentioned may be understood based on the following descriptions and may be more clearly understood based on embodiments according to the present disclosure. Further, it will be easily understood that the purposes and advantages according to the present disclosure may be realized using means shown in the claims and combinations thereof.

According to an aspect of the present disclosure, a method for operating a computational storage device includes receiving by a storage controller and from a host device: (1) a compute namespace setting instruction establishing a compute namespace, (2) a latency threshold value related to the compute namespace, (3) a program, (4) a first execute command using the program, and (5) a second execute command using the program. Additionally, the storage controller transmits to the host device a latency message in response to the second execute command.

According to another aspect of the present disclosure, a method for operating a host device having a virtual machine includes transmitting by the virtual machine to a storage device: (1) a setting instruction to establish a compute namespace to process a command from the virtual machine, (2) a latency threshold value related to the compute namespace, (3) a program to be loaded into the compute namespace, (4) a first execute command using the program, and (5) a second execute command using the program. Additionally, the virtual machine receives from the storage device a latency message in response to the second execute command.

According to another aspect of the present disclosure, a computational storage device includes a non-volatile memory to store data and a storage controller. The storage controller controls the non-volatile memory and an accelerator. The accelerator processes computing on the data based on an execute command received from a host device and using a program provided from the host device. The storage controller receives an execute command from the host device. In response to a latency-related state being a first state while storing the execute command received from the host device in a command queue to await processing by the accelerator, the storage controller stores the execute command in the command queue. In response to the latency-related state being a second state different from the first state, the storage controller transmits a latency message to the host device.

BRIEF DESCRIPTION OF DRAWINGS

The above and other aspects and features of the present disclosure will become more apparent by describing in detail illustrative embodiments thereof with reference to the attached drawings, in which.

DETAILED DESCRIPTION

Hereinafter, with reference to the accompanying drawings, embodiments according to the technical idea of the present disclosure will be described.

Figure 1:
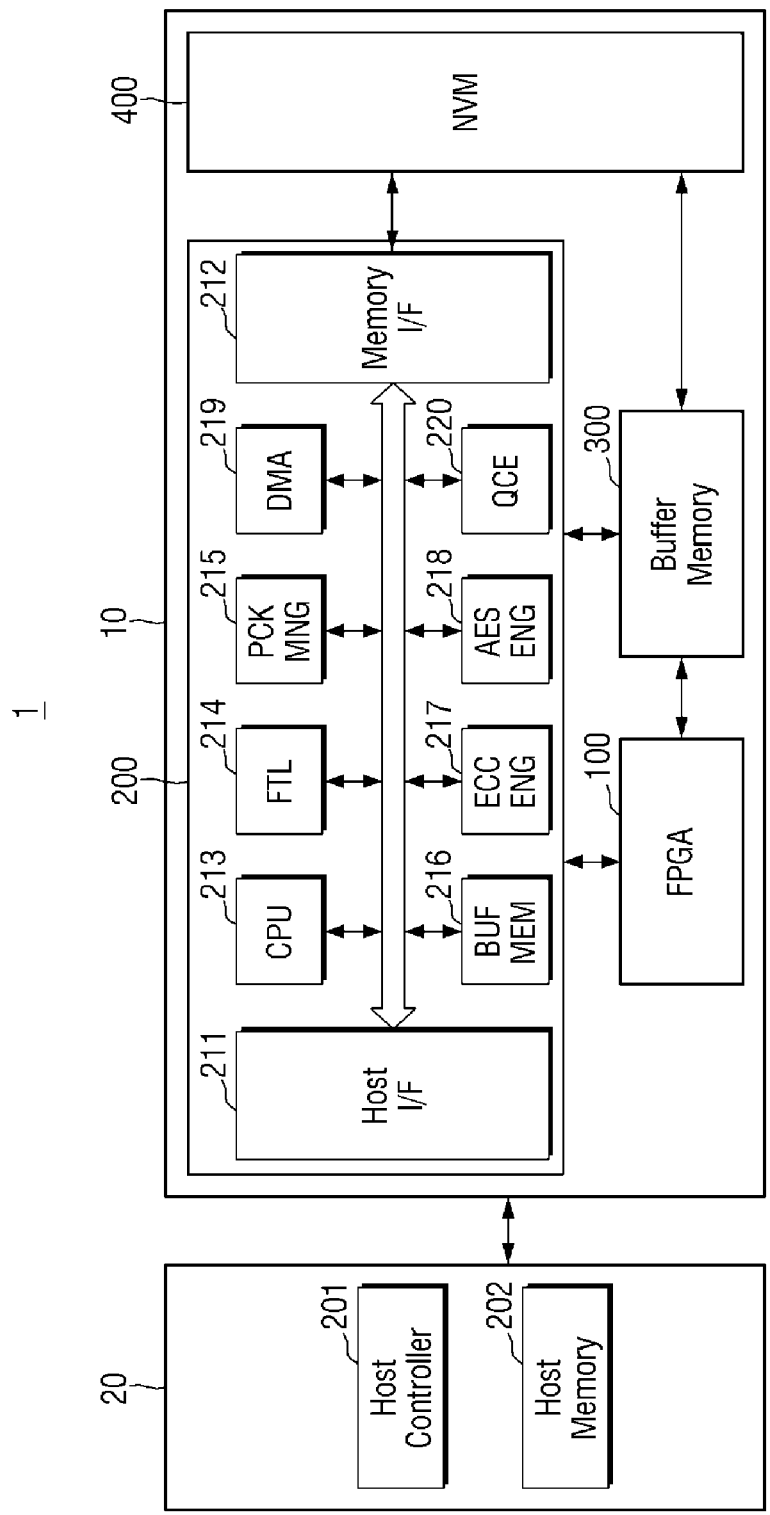
FIG. 1 is a block diagram of a memory system according to some embodiments.

FIG. 1 is a block diagram of a memory system according to some embodiments.

Referring to FIG. 1, a memory system 1 may include a host device 20 and a storage device 10.

The host device 20 may include a host controller 201 and a host memory 202. The host controller 201 may control overall operations of the host device 20. In some embodiments, the host controller 201 may include a plurality of entities respectively driven with a plurality of virtual machines (VM). The entities respectively driven with different virtual machines may control the storage device 10 independently of each other.

The host memory 202 may temporarily store therein data transmitted from an external device, data to be transmitted to the storage device 10, or data transmitted from the storage device 10. In some embodiments, the host device 20 may be implemented as an application processor (AP). However, embodiments of the present disclosure are not limited thereto.

The storage device 10 may be, for example, a computational storage device.

The storage device 10 may include a field-programmable gate array (FPGA) 100, a storage controller 200, a buffer memory 300 and a non-volatile memory 400.

The storage device 10 may include storage media for storing therein data according to a request from the host device 20. In an example, the storage device 10 may include at least one of an SSD (solid state drive), an embedded memory, or a removable external memory. When the storage device 10 is embodied as the SSD, the storage device 10 may be a device complying with an NVMe (non-volatile memory express) standard. When the storage device 10 is embodied as the embedded memory or the external memory, the storage device 10 may be a device complying with a UFS (universal flash storage)) or eMMC (embedded multi-media card) standard. Each of the storage device 10 and the host device 20 may generate and transmit a packet according to an adopted standard protocol.

When the non-volatile memory 400 of the storage device 10 includes a flash memory, the flash memory may include a 2D NAND memory array or a 3D (or vertical) NAND (VNAND) memory array. In another example, the storage device 10 may include various other types of non-volatile memories. For example, the storage device 10 may include MRAM (Magnetic RAM), Spin-Transfer Torque MRAM, conductive bridging RAM (CBRAM), FeRAM (Ferroelectric RAM), PRAM (Phase RAM), Resistive memory (Resistive RAM), and other various types of memories.

The FPGA 100 may perform various kinds of computing and calculations on data stored in the buffer memory 300. In some embodiments, the FPGA 100 may include a plurality of accelerators for performing various kinds of computing, calculation, etc. on the data stored in the buffer memory 300 based on a command provided from the host device 20.

The FPGA 100 may perform computing on the data temporarily stored in the buffer memory 300 using an algorithm mapped to a hardware logic configuration. In some embodiments, the FPGA 100 may perform computing on the data stored in the non-volatile memory 400 without intervention of the host device 20.

The storage controller 200 may include a host interface 211, a memory interface 212 and a CPU (central processing unit) 213. Further, the storage controller 200 may further include a Flash Translation Layer (FTL) 214, a packet manager 215, a buffer memory 216, an ECC (error correction code) engine 217, an AES (advanced encryption standard engine) 218, a DMA (Direct Memory Access) engine 219, and a queue control engine 220.

The storage controller 200 may further include a working memory into which the flash conversion layer (FTL) 214 is loaded. Data write and read operations to and from the non-volatile memory 400 may be controlled by the CPU 213 executing the flash translation layer.

The host interface 211 may transmit/receive a packet to/from the host device 20. The packet transmitted from the host device 20 to the host interface 211 may include a command or data to be written to the non-volatile memory 400. The packet transmitted from the host interface 211 to the host device 20 may include a response to the command or data read from the non-volatile memory 400.

The memory interface 212 may transmit data to be written to the non-volatile memory 400 or receive data read from the non-volatile memory 400. The memory interface 212 may be implemented to comply with a standard protocol such as a toggle or ONFI (Open NAND Flash Interface).

The flash translation layer 214 may perform several functions, such as address mapping, wear-leveling, and garbage collection. The address mapping operation refers to an operation to change a logical address received from the host device 20 into a physical address used to store data in the non-volatile memory 400. The wear-leveling refers to a technique to ensure that blocks in the non-volatile memory 400 are used uniformly to prevent excessive degradation of a specific block. In one example, the wear-leveling may be implemented via a firmware technique that balances erase counts of physical blocks. The garbage collection refers to a technique to copy valid data of an existing block to a new block and then erase the existing block to secure available capacity in the non-volatile memory 400.

The packet manager 215 may generate the packet according to a protocol of an interface which the host device 20 and the packet manager 215 agree to use or may parse various information from the packet received from the host device 20.

Further, the buffer memory 216 may temporarily store therein data to be written to the non-volatile memory 400 or data to be read from the non-volatile memory 400. The buffer memory 216 may have a component present in the storage controller 200 or may be disposed outside the storage controller 200.

The ECC engine 217 may perform an error detection and correction function on read data read from the non-volatile memory 400. More specifically, the ECC engine 217 may generate parity bits related to write data to be written into the non-volatile memory 400. Then, the generated parity bits together with the write data may be stored in the non-volatile memory 400. In reading the read data from the non-volatile memory 400, the ECC engine 217 may correct an error in the read data using the parity bits read from the non-volatile memory 400 and may output the error-corrected read data.

The AES engine 218 may perform at least one of an encryption operation and a decryption operation on data input to the storage controller 200 using a symmetric-key algorithm.

The DMA engine 219 may read or fetch a data block from the buffer memory 300 so that the accelerator of the FPGA 100 may perform computing on the read or fetched data block. Although the drawing illustrates that the DMA engine 219 is included in the storage controller 200, embodiments are not limited thereto, and the DMA engine 219 may be implemented to be included in the FPGA 100 or may be implemented to be disposed outside the storage controller 200.

The queue control engine 220 monitors a status in which an execute command provided from the host device 20 is queued. When it is determined that it is difficult for the accelerator to process the execute command within a predetermined time, the queue control engine 220 may perform a predetermined operation (for example, transmitting a notification signal to the host device 20 or rejecting reception of a new execute command) Although the drawing illustrates that the queue control engine 220 is included in the storage controller 200, embodiments are not limited thereto, and the queue control engine 220 may be implemented to be included in the FPGA 100 or may be implemented to be disposed outside the storage controller 200. A more detailed description of the queue control engine 220 will be set forth later.

The buffer memory 300 may buffer data stored in the non-volatile memory 400. Further, the buffer memory 300 may buffer data (for example, data on which the accelerator has performed computing) transmitted from the FPGA 100. That is, when the FPGA 100 uses the data stored in the non-volatile memory 400, the buffer memory 300 may temporarily store therein the data stored in the non-volatile memory 400 so that the FPGA 100 may use the same. The non-volatile memory 400 may store therein data required when the FPGA 100 performs the computing.

Figure 2:
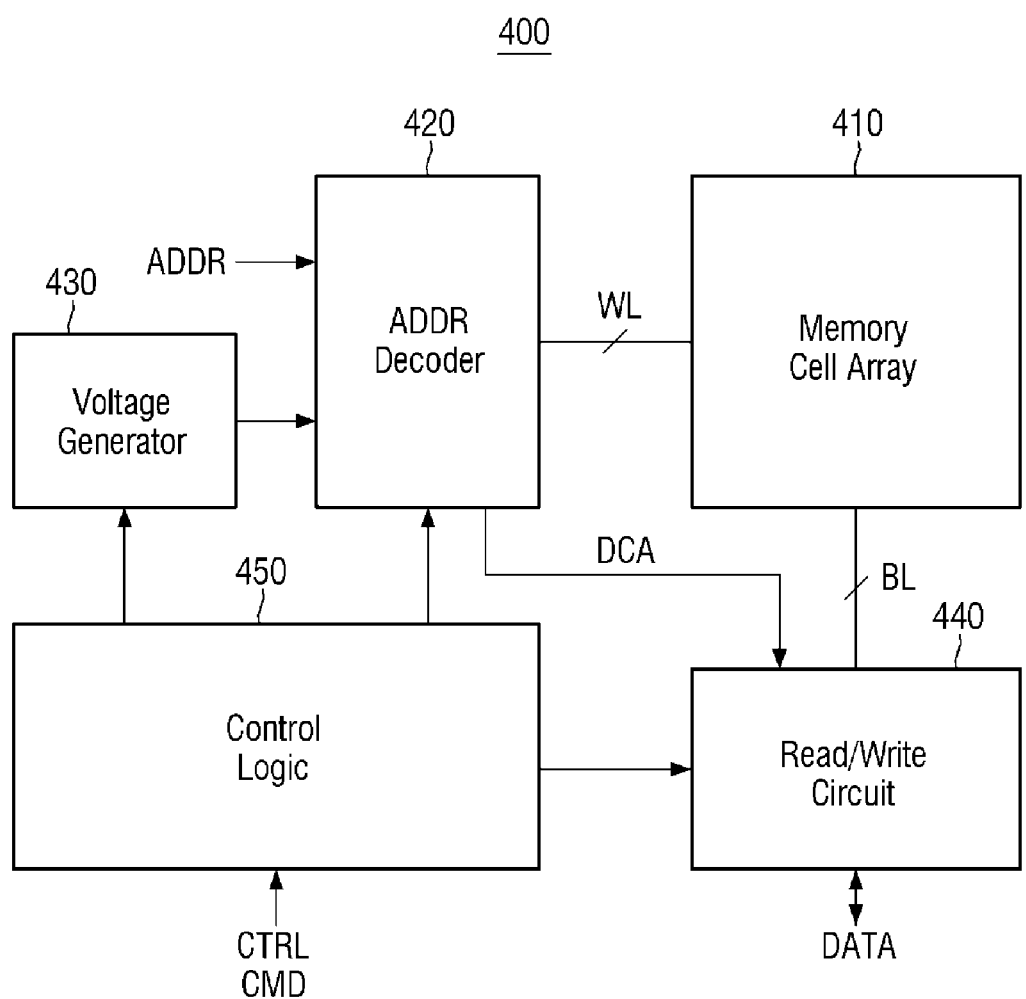
FIG. 2 is a block diagram of a non-volatile memory of FIG. 1.

FIG. 2 is a block diagram of the non-volatile memory of FIG. 1.

Referring to FIG. 2, the non-volatile memory 400 may include a memory cell array 410, an address decoder 420, a voltage generator 430, a read/write circuit 440, and a control logic circuit 450.

The memory cell array 410 may be connected to the address decoder 420 via word-lines WL. The memory cell array 410 may be connected to the read/write circuit 440 via bit-lines BL. The memory cell array 410 may include a plurality of memory cells. For example, memory cells arranged in a row direction may be connected to the same word-line WL, while memory cells arranged in a column direction may be connected to the same bit-line BL.

The address decoder 420 may be connected to the memory cell array 410 via the word-line WL. The address decoder 420 may operate in response to control of the control logic circuit 450. The address decoder 420 may receive an address ADDR from the storage controller 200. The address decoder 420 may receive a voltage necessary for an operation, such as program and read operations, from the voltage generator 430.

The address decoder 420 may decode a row address among the received addresses ADDR. The address decoder 420 may select a word-line WL using the decoded row address. A decoded column address DCA may be provided to the read/write circuit 440. For example, the address decoder 420 may include a row decoder, a column decoder, and an address buffer.

The voltage generator 430 may generate a voltage required for an access operation under control of the control logic circuit 450. For example, the voltage generator 430 may generate a program voltage and a program verification voltage necessary to perform a program operation. For example, the voltage generator 430 may generate read voltages necessary to perform a read operation and may generate an erase voltage and an erase verification voltage necessary to perform an erase operation. Further, the voltage generator 430 may provide a voltage required to perform each operation to the address decoder 420.

The read/write circuit 440 may be connected to the memory cell array 410 via the bit-line BL. The read/write circuit 440 may send and receive data DATA to and from the storage controller 200. The read/write circuit 440 may operate in response to control of the control logic circuit 450. The read/write circuit 440 may receive the decoded column address DCA from the address decoder 420. The read/write circuit 440 may select a bit-line BL using the decoded column address DCA.

For example, the read/write circuit 440 may program the received data DATA into the memory cell array 410. The read/write circuit 440 may read data from the memory cell array 410 and provide the read data to an external device (for example, the storage controller 200). For example, the read/write circuit 440 may include components such as a sense amplifier, a write driver, a column select circuit, a page buffer, etc. That is, the read/write circuit 440 may buffer the data DATA received from the storage controller 200 into the page buffer and program the buffered data DATA into the memory cell array 410.

The control logic circuit 450 may be connected to the address decoder 420, the voltage generator 430 and the read/write circuit 440. The control logic circuit 450 may control an operation of the non-volatile memory 400. The control logic circuit 450 may operate in response to a control signal CRTL and a command CMD (for example, a write command and a read command) provided from the storage controller 200.

Figure 3:
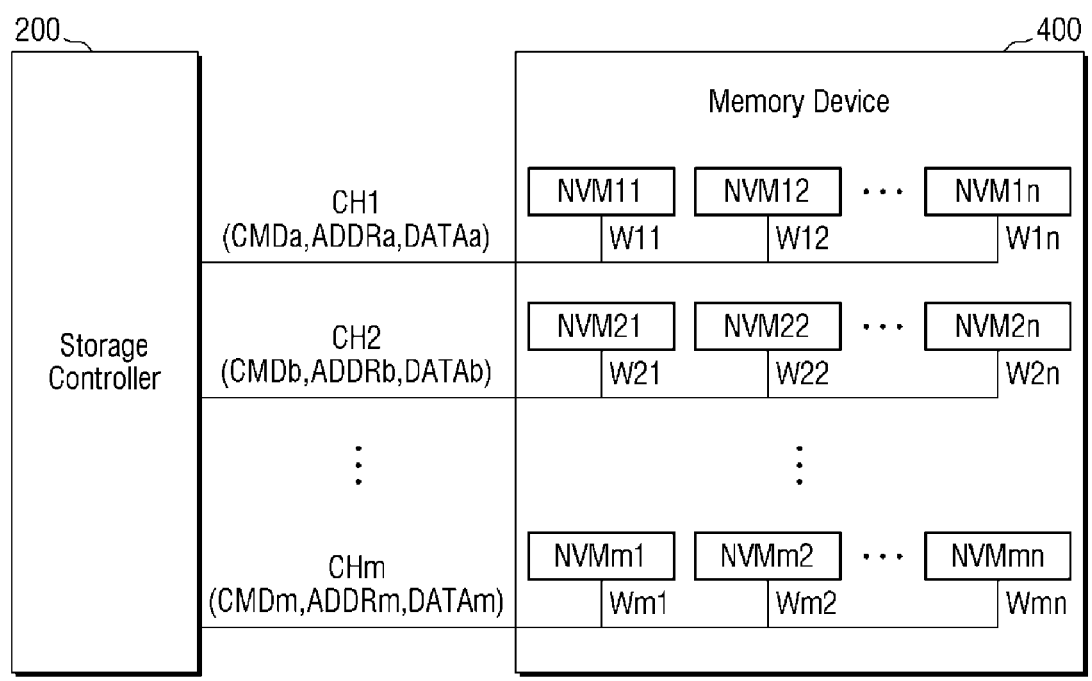
FIG. 3 is a block diagram of a storage controller and a non-volatile memory of FIG. 1.

FIG. 3 is a block diagram of the storage controller and the non-volatile memory of FIG. 1.

Referring to FIG. 3, the storage device 10 may include the storage controller 200 and the non-volatile memory 400. The storage device 10 may support a plurality of channels CH1 to CHm, and the storage controller 200 and the non-volatile memory 400 may be connected to each other via the plurality of channels CH1 to CHm. For example, the storage device 10 may be implemented as a storage device such as an SSD (solid state drive).

The non-volatile memory 400 may include a plurality of non-volatile memory devices NVM11 to NVMmn Each of the non-volatile memory devices NVM11 to NVMmn may be connected to one of the plurality of channels CH1 to CHm via a corresponding way. For example, the non-volatile memory devices NVM11 to NVM1$n$ may be connected to the first channel CH1 via ways W11 to W1$n$, the non-volatile memory devices NVM21 to NVM2$n$ may be connected to the second channel CH2 via ways W21 to W2$n$, and the non-volatile memory devices NVMm1 to NVMmn may be connected to the m$^{th}$ channel CHm via ways Wm1 to Wmn. In an illustrative embodiment, each of the non-volatile memory devices NVM11 to NVMmn may be implemented as an arbitrary memory unit which may operate according to an individual command from the storage controller 200. For example, each of the non-volatile memory devices NVM11 to NVMmn may be implemented as a chip or a die. However, the present disclosure is not limited thereto.

The storage controller 200 may transmit/receive signals to and from the non-volatile memory 400 via the plurality of channels CH1 to CHm. For example, the storage controller 200 may send commands CMDa to CMDm, addresses ADDRa to ADDRm, and data DATAa to DATAm to the non-volatile memory 400 via the channels CH1 to CHm or may receive the data DATAa to DATAm from the non-volatile memory 400 via the channels CH1 to CHm.

The storage controller 200 may select one of the non-volatile memory devices connected to each corresponding channel via each corresponding channel and transmit/receive signals to and from the selected non-volatile memory device via each corresponding channel. For example, the storage controller 200 may select the non-volatile memory device NVM11 from among the non-volatile memory devices NVM11 to NVM1$n$ connected to the first channel CH1 via the first channel CH1. The storage controller 200 may transmit the command CMDa, the address ADDRa, and the data DATAa to the selected non-volatile memory device NVM11 via the first channel CH1 or may receive the data DATAa from the selected non-volatile memory device NVM11 via the first channel CH1.

The storage controller 200 may transmit and receive signals to and from the non-volatile memory 400 in a parallel manner via different channels. For example, the storage controller 200 may transmit the command CMDb to the non-volatile memory 400 via the second channel CH2 while transmitting the command CMDa to the non-volatile memory 400 via the first channel CH1. For example, the storage controller 200 may receive the data DATAb from the non-volatile memory 400 via the second channel CH2 while receiving the data DATAa from the non-volatile memory 400 via the first channel CH1.

The storage controller 200 may control overall operations of the non-volatile memory 400. The storage controller 200 may transmit a signal to the channels CH1 to CHm to control each of the non-volatile memory devices NVM11 to NVMmn connected to the channels CH1 to CHm. For example, the storage controller 200 may transmit the command CMDa and the address ADDRa to the first channel CH1 to control a selected one of the non-volatile memory devices NVM11 to NVM1$n$.

Each of the non-volatile memory devices NVM11 to NVMmn may operate under control of the storage controller 200. For example, the non-volatile memory device NVM11 may program the data DATAa based on the command CMDa, the address ADDRa, and the data DATAa provided to the first channel CH1. For example, the non-volatile memory device NVM21 may read-out the data DATAb based on the command CMDb and the address ADDRb provided to the second channel CH2 and transmit the read-out data DATAb to the storage controller 200.

FIG. 3 illustrates that the non-volatile memory 400 communicates with the storage controller 200 via m channels and the non-volatile memory 400 includes n non-volatile memory devices corresponding to each channel. However, the number of the channels and the number of the non-volatile memory devices connected to one channel may be variously changed.

Figure 4:
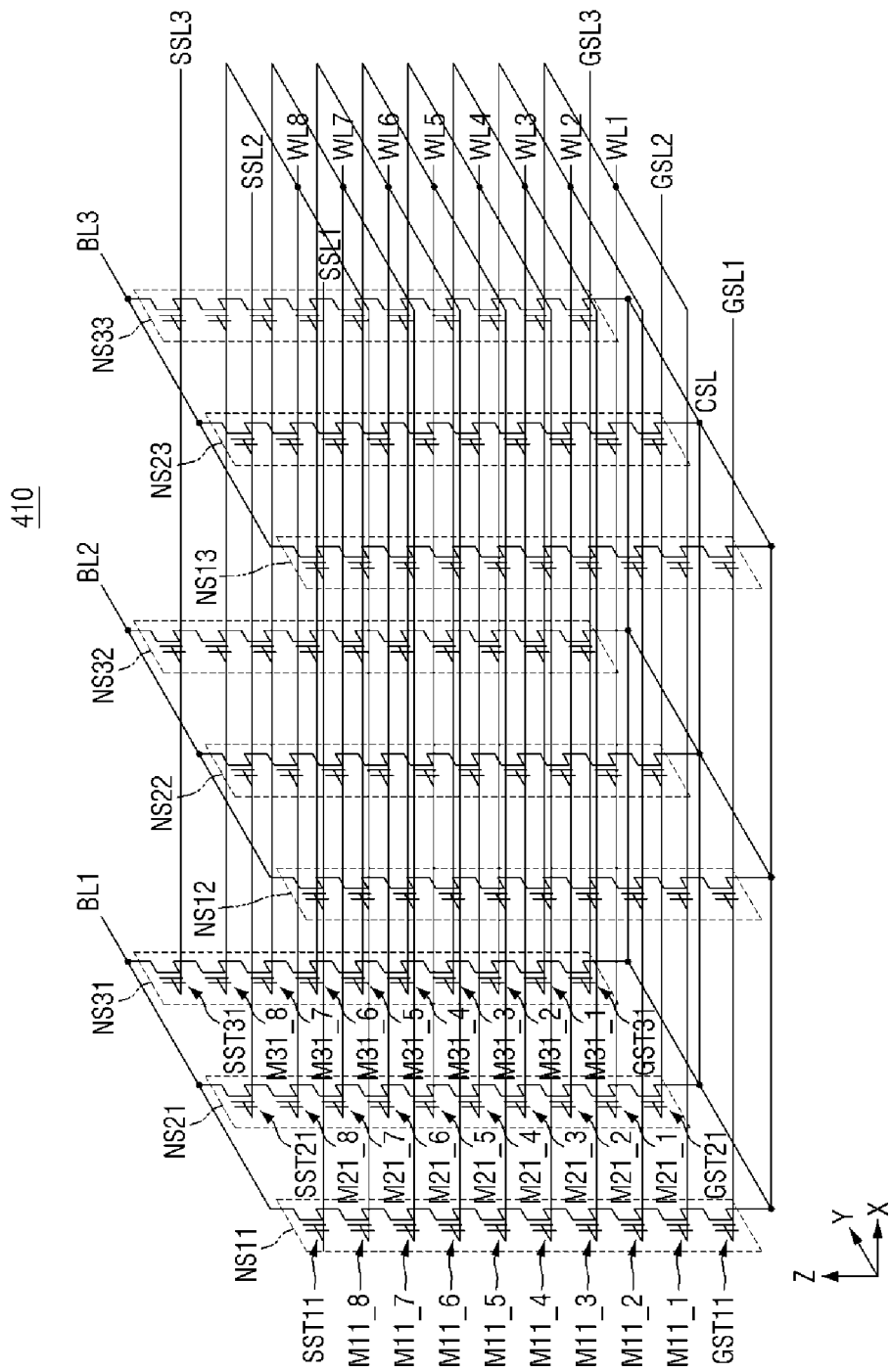
FIG. 4 is an illustrative circuit diagram showing a memory cell array of FIG. 2.

FIG. 4 is an illustrative circuit diagram showing the memory cell array of FIG. 2.

Referring to FIG. 4, a plurality of cell strings NS11, NS21, NS31, NS12, NS22, NS32, NS13, NS23, and NS33 may be disposed on a substrate and may be arranged in a first direction X and a second direction Y. The plurality of cell strings NS11, NS21, NS31, NS12, NS22, NS32, NS13, NS23, and NS33 may extend in a third direction Z. The plurality of cell strings NS11, NS21, NS31, NS12, NS22, NS32, NS13, NS23, and NS33 may be commonly connected to a common source line CSL formed on or in the substrate.

It is illustrated that the bottommost cells in the third direction Z among cells of the plurality of cell strings NS11, NS21, NS31, NS12, NS22, NS32, NS13, NS23, and NS33 are connected to the common source line CSL. However, it may suffice that the common source line CSL is electrically connected to the bottommost cells in the third direction Z among cells of the plurality of cell strings NS11, NS21, NS31, NS12, NS22, NS32, NS13, NS23, and NS33. The present disclosure is not limited to a configuration that the common source line CSL is physically positioned below the plurality of cell strings NS11, NS21, NS31, NS12, NS22, NS32, NS13, NS23, and NS33. Further, it is illustrated that the plurality of cell strings NS11, NS21, NS31, NS12, NS22, NS32, NS13, NS23, and NS33 are arranged in a 3×3 array. However, an arrangement form and the number of the plurality of cell strings disposed in the memory cell array 410 are not limited thereto.

Some cell strings NS11, NS12, and NS13 may be connected to a first ground select line GSL1. Some cell strings NS21, NS22, and NS23 may be connected to a second ground select line GSL2. Some cell strings NS31, NS32, and NS33 may be connected to a third ground select line GSL3.

Further, some cell strings NS11, NS12, and NS13 may be connected to a first string select line SSL1. Some cell strings NS21, NS22, and NS23 may be connected to a second string select line SSL2. Some cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor SST connected to each string select line. Further, each of the plurality of cell strings NS11, NS21, NS31, NS12, NS22, NS32, NS13, NS23, and NS33 may each include a ground select transistor GST connected to each ground select line.

One end of each of the plurality of cell strings NS11, NS21, NS31, NS12, NS22, NS32, NS13, NS23, and NS33 may be connected to the common source line CSL. Further, in each of the plurality of cell strings NS11, NS21, NS31, NS12, NS22, NS32, NS13, NS23, and NS33, a plurality of memory cells may be sequentially stacked in the third direction Z while being disposed between the ground select transistor and the string select transistor. Although not shown in FIG. 4, each of the plurality of cell strings NS11, NS21, NS31, NS12, NS22, NS32, NS13, NS23, and NS33 may include dummy cells disposed between the ground select transistor and the string select transistor. Further, the number of the string select transistors included in each cell string is not limited to this drawing.

For example, the cell string NS11 may include a ground select transistor GST11 disposed at the bottommost level in the third direction Z, a plurality of memory cells M11_1 to M11_8 sequentially stacked in the third direction Z while being disposed on the ground select transistor GST11, and a string select transistor SST11 stacked on top of the topmost memory cell M11_8. Further, the cell string NS21 may include a ground select transistor GST21 disposed at the bottommost level in the third direction Z, a plurality of memory cells M21_1 to M21_8 sequentially stacked in the third direction Z while being disposed on the ground select transistor GST21, and a string select transistor SST21 stacked on top of the topmost memory cell M21_8. Further, the cell string NS31 may include a ground select transistor GST31 disposed at the bottommost level in the third direction Z, a plurality of memory cells M31_1 to M31_8 sequentially stacked in the third direction Z while being disposed on the ground select transistor GST31, and a string select transistor SST31 stacked on top of the topmost memory cell M31_8. This may be applied to configuration of each of other strings.

Memory cells positioned at the same vertical level in the third direction Z from the substrate or the ground select transistor may be electrically connected to the same word-line. For example, the memory cells M11_1, M21_1, and M31_1 at the same vertical level may be connected to the first word-line WL1. Further, the memory cells M11_2, M21_2, and M31_2 at the same vertical level may be connected to a second word-line WL2. This may be applied to an arrangement and a structure of memory cells connected to each of a third word-line WL3 to an eighth word-line WL8, and thus description thereof is omitted.

One end of the string select transistor of each of the plurality of cell strings NS11, NS21, NS31, NS12, NS22, NS32, NS13, NS23, and NS33 may be connected to the bit-line BL1, BL2, or BL3. For example, one end of each of string select transistors ST11, SST21, and SST31 may be connected to the bit-line BL1 extending in the second direction Y. This may be applied to other string select transistors connected to the bit-line BL2 or BL3. Thus, description thereof is omitted.

Memory cells corresponding to one string (or ground) select line and one word-line may constitute one page. A write operation and a read operation may be performed on a page basis. Each of the memory cells of each page may store at least two bits. Bits written to the memory cells of each page may constitute logical pages.

The memory cell array 410 may be embodied as a three-dimensional (3D) memory array. The three-dimensional memory array may be formed monolithically at one or more physical levels of arrays of memory cells having active areas disposed on top of a substrate (not shown) and a circuit involved in operations of the memory cells. The circuit involved in the operations of the memory cells may be located in or on the substrate. The phrase "being formed monolithically" means that each of layers of levels of the 3D array may be directly deposited on each of layers of sub-levels of the 3D array.

Figure 5:
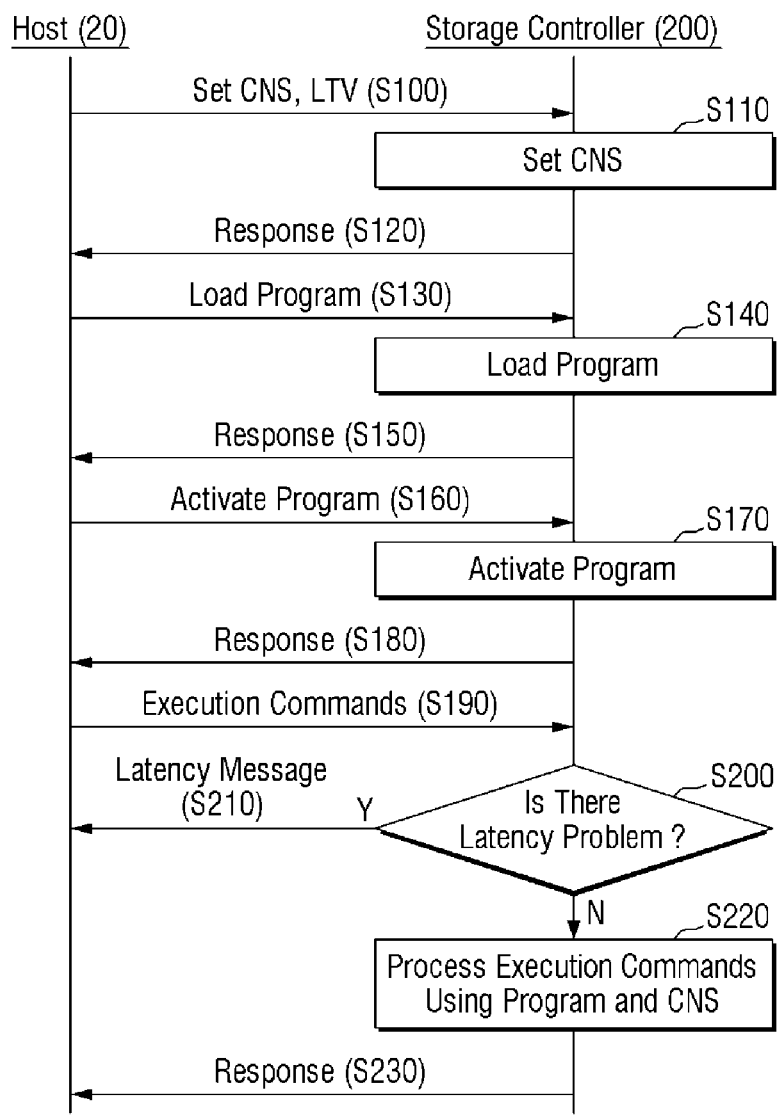
FIG. 5 is a flowchart illustrating an operation of a memory system according to some embodiments.

FIG. 5 is a flowchart illustrating an operation of a memory system according to some embodiments. FIG. 6 to FIG. 10 are diagrams for illustrating an operation of the memory system shown in FIG. 5.

Referring to FIG. 1 and FIG. 5, the host device 20 sends, to the storage controller 200, a setting instruction that instructs setting of a compute namespace CNS to process a command of the host device 20. Then, the host device 20 transmits a latency threshold value LTV related to the compute namespace CNS to the storage controller 200 in S100.

Upon receiving the setting instruction, the storage controller 200 sets the compute namespace CNS to process the command of the host device 20 in the storage device 10 in S110.

Figure 6:
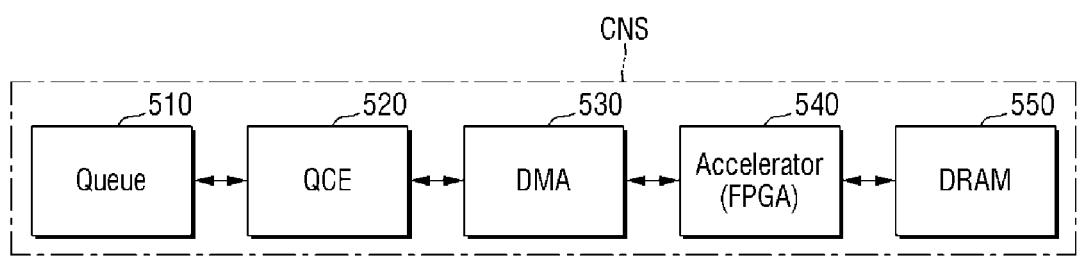
FIG. 6 to FIG. 10 are diagrams for illustrating an operation of a memory system shown in FIG. 5.

Referring to FIG. 6, in some embodiments, the compute namespace CNS may include a command queue 510, a queue control engine 520, a DMA engine 530, an accelerator 540, and a buffer memory 550. However, embodiments are not limited thereto, and some components of the illustrated compute namespace CNS may be omitted if necessary or a component (not shown) may be added to the compute namespace CNS as necessary.

The command queue 510 may store therein an execute command for driving the accelerator 540, which execute command is provided from the host device 20. In this regard, the execute command may be, for example, an execute command complying with an NVMe TP 4091 standard (NVMe TP 4091 Computational Programs Command Set Specification). However, embodiments are not limited thereto.

The command queue 510 may sequentially store therein the execute commands provided from the host device 20 and, for example, output the stored execute commands in a first-in and first-out (FIFO) scheme.

In some embodiments, the command queue 510 may be disposed, for example, in the buffer memory (216 in FIG. 1). In some embodiments, the command queue 510 may be implemented by implementing the buffer memory (216 of FIG. 1) using SRAM. However, embodiments are not limited thereto.

The queue control engine 520 may manage the execute commands stored in the command queue 510. When it is determined that the accelerator 540 is in an idle state, the queue control engine 520 may deliver the stored execute command to the accelerator 540 so that the accelerator 540 processes computing based on the execute command.

In some embodiments, the queue control engine 520 may manage the command queue 510 as a circular queue. When a queue index increases, the queue control engine 520 may recognize that a new execute command has been stored.

In some embodiments, the queue control engine 520 may be implemented in a form of the queue control engine 220 in the storage controller (200 of FIG. 1). However, embodiments are not limited thereto.

The DMA engine 530 may read or fetch data from the buffer memory 550 so that the accelerator may process computing based on the execute command. In some embodiments, the DMA engine 530 may be implemented in a form of the DMA engine 219 in the storage controller (200 of FIG. 1). However, embodiments are not limited thereto.

The accelerator 540 may be implemented, for example, in a form of an FPGA (using an FPGA) and may process computing based on the execute command under control of the queue control engine 520. In some embodiments, the FPGA 100 of FIG. 1 may be used to implement the accelerator 540. In some embodiments, a plurality of accelerators 540 may be disposed. In this case, the accelerators 540 may be used to set different compute namespaces CNS.

The buffer memory 550 provides data necessary for the accelerator 540 to process computing based on the execute command and may store therein a computing processing result of the accelerator 540. In some embodiments, the buffer memory 550 may be implemented, for example, as a DRAM. In some embodiments, the buffer memory 550 may be implemented using the buffer memory (300 of FIG. 1). However, embodiments are not limited thereto.

An embodiment in which each of the command queue 510, the queue control engine 520, the DMA engine 530, and the accelerator 540 is implemented in a hardware form has been described above. However, embodiments are not limited thereto. If necessary, at least one of the command queue 510, the queue control engine 520, the DMA engine 530, and the accelerator 540 may be implemented as in a software form.

Upon receiving the setting instruction, the storage controller 200 may set necessary resources in the storage device 10 as the compute namespace CNS to process the command of the host device 20 in response to the setting instruction. The compute namespace CNS may be a compute namespace CNS according to an NVMe standard. However, embodiments are not limited thereto.

Further, the compute namespace CNS means a set of computational resources in the storage device 10 required to process the command of the host device 20. The compute namespace CNS may be distinguished from an NVM namespace for managing an area of the non-volatile memory (400 in FIG. 1) in a divided manner or a memory namespace for managing an area of the buffer memory (300 in FIG. 1) in a divided manner.

The latency threshold value LTV related to the compute namespace CNS received from the host device 20 means a time allowed when the computing is processed using the compute namespace CNS. For example, when the latency threshold value LTV related to the set compute namespace CNS is 30 ms, the storage controller 200 must respond to the execute command received from the host device 20 within 30 ms with a computing processing result related to the received execute command.

Referring to FIG. 1 and FIG. 5, upon completing the compute namespace CNS setting, the storage controller 200 informs the host device 20 that the compute namespace CNS setting has been completed in S120.

Next, the host device 20 instructs the storage controller 200 to load a program to be used into the set compute namespace CNS in S130. Then, in response to the instruction, the storage controller 200 loads the program into the set compute namespace CNS in S140, and informs the host device 20 that the program load has been completed in S150.

Figure 7:
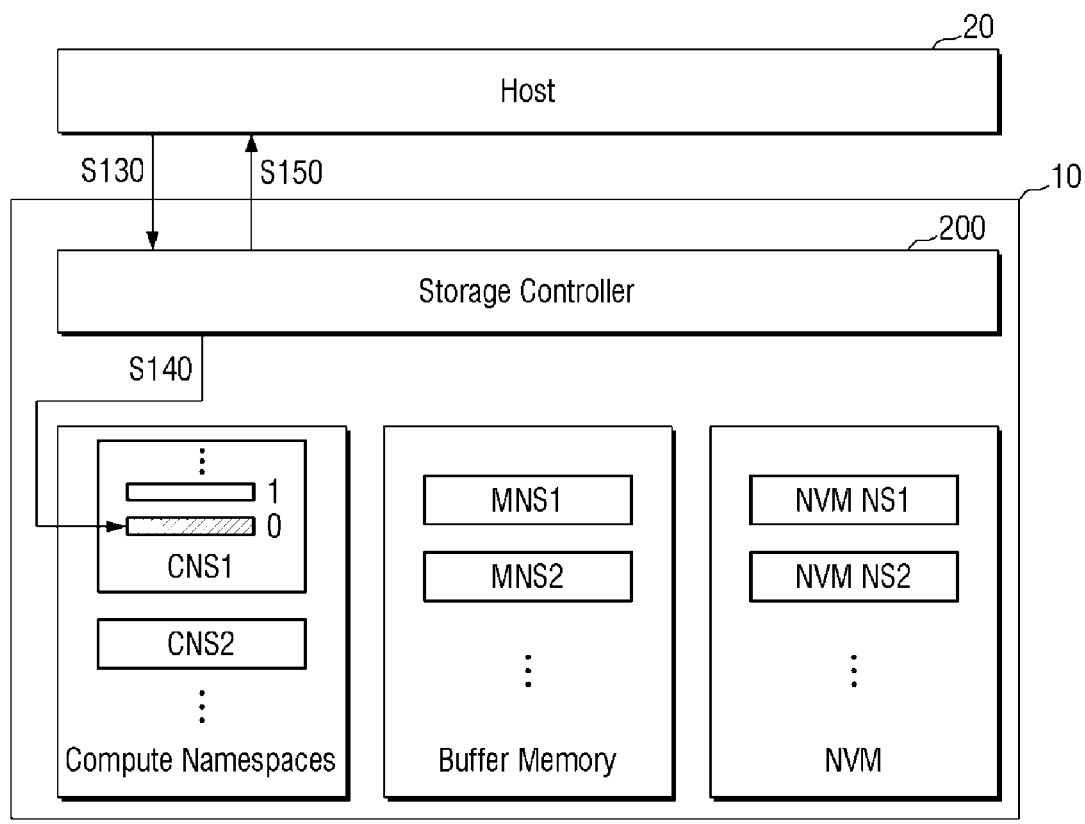

For example, referring to FIG. 7, the host device 20 instructs the storage controller 200 to load the program into a slot #0 of the compute namespace CNS1 in S130. In response to the instruction, the storage controller 200 loads the program into the #0 slot of the compute namespace CNS1 in S140, and informs the host device 20 that the program load has been completed in S150.

The illustrated compute namespaces CNS1 and CNS2 are defined using computational resources in the storage device 10. As described above, the illustrated compute namespaces CNS1 and CNS2 are distinguished from NVM namespaces NVM NS1 and NVM NS2 that manage an area of the non-volatile memory NVM in a divided manner or memory namespaces MNS1 and MNS2 that manage an area of the buffer memory in a divided manner.

Next, referring to FIG. 1 and FIG. 5, the host device 20 instructs the storage controller 200 to activate the loaded program in S160. Then, in response to the instruction, the storage controller 200 activates the loaded program in S170 and informs the host device 20 that the program activation has been completed in S180.

Figure 8:
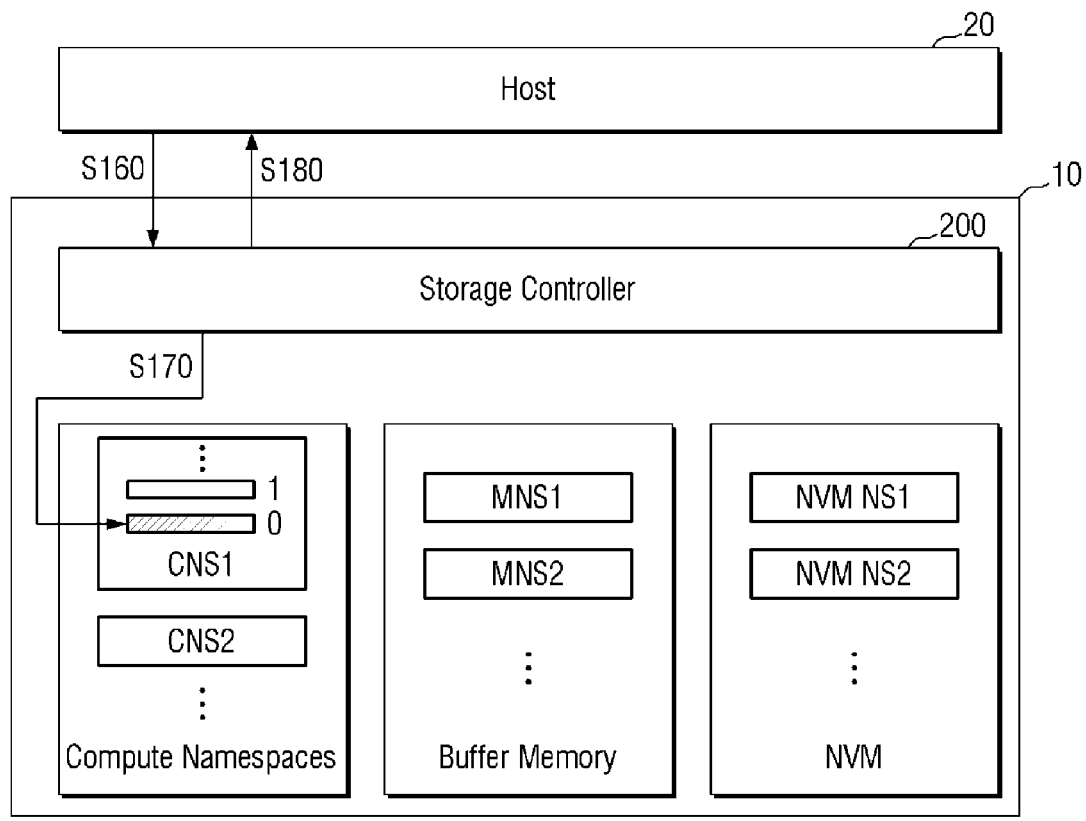

For example, referring to FIG. 8, the host device 20 instructs the storage controller 200 to activate the program loaded in the slot #0 of the compute namespace CNS1 in S160. In response to the instruction, the storage controller 200 activates the program loaded in the slot #0 of the compute namespace CNS1 in S170 and informs the host device 20 that the program activation has been completed in S180.

Next, referring to FIG. 1 and FIG. 5, the host device 20 transmits execute commands using the activated program to the storage controller 200 in S190. Then, the storage controller 200 identifies whether there is a latency problem in processing the computing based on the received execute commands in S200. If it is determined that there is the latency problem (S200-Y), the storage controller 200 transmits a latency message to the host device 20 in S210.

The latency message is a message indicating that the computing based on the received execute command cannot be processed within the latency threshold value LTV and, thus, an additional action is required. In some embodiments, the storage controller 200 may transmit the latency message to the host device 20 in an AER (Asynchronous Error Reporting) scheme. Further, in some embodiments, the storage controller 200 may transmit a message refusing to receive a new execute command to the host device 20 in a form of the latency message.

After receiving this latency message, the host device 20 may wait for a certain amount of time and may send an execute command to the storage controller 200 again, may try to perform computing using another storage device 10, or may try to perform computing using another computational resource in the host device 10.

If it is determined that there is no latency problem (S200-N), the storage controller 200 processes the computing based on the execute commands using the activated program and the set compute namespace in S220. Then, the storage controller 200 informs the host device 20 that processing of the computing based on the received execute commands has been completed in S230.

Hereinafter, referring to FIG. 9 and FIG. 10, an operation in which the storage controller 200 identifies whether there is the latency problem in processing the computing based on the received execute commands will be described in more detail.

Figure 9:
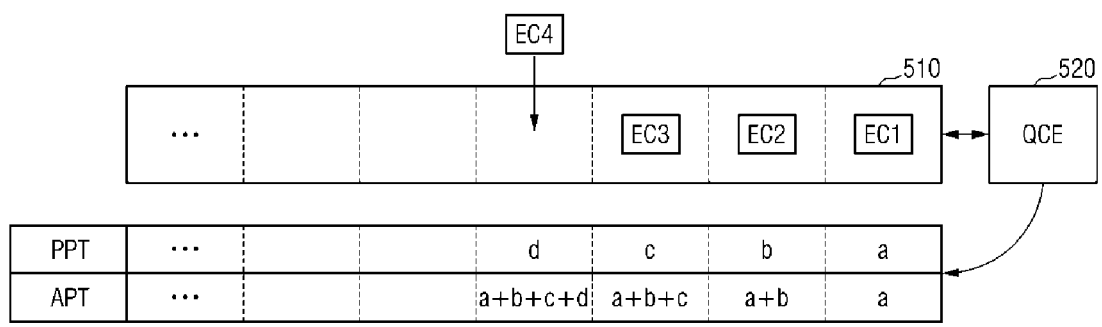

First, referring to FIG. 9, execute commands EC1, EC2, EC3, and EC4 received from the host device 20 are sequentially stored in the command queue 510, as described above.

Whenever a new execute command is received, the queue control engine 520 calculates a predicted processing time PPT required for the accelerator to process the computing based on each of the received execute commands. Then, the queue control engine 520 calculates a cumulative processing time APT of the command queue 510 required for the accelerator to process all computing based on all of the execute commands currently stored in the command queue 510. Then, when the cumulative processing time APT is greater than the latency threshold value LTV of the set compute namespace CNS, the queue control engine 520 determines that there is the latency problem.

Taking an example as shown in FIG. 9, when the execute command EC1 is received from the host device 20, the queue control engine 520 calculates a predicted processing time PPT required for the accelerator to process computing based on the execute command EC1. In this regard, the predicted processing time PPT may be calculated as a. In this regard, since no other execute commands are stored in the command queue 510, the cumulative processing time APT of the command queue 510 is a. If a is smaller than or equal to the latency threshold value LTV of the set compute namespace CNS, the queue control engine 520 stores the execute command EC1 in the command queue 510.

Next, when the execute command EC2 is received from the host device 20, the queue control engine 520 calculates a predicted processing time PPT required for the accelerator to process computing based on the execute command EC2. In this regard, the predicted processing time PPT may be calculated as b. In this regard, since the execute command EC1 is already stored in the command queue 510, the cumulative processing time APT of the command queue 510 is a+b. If a+b is smaller than or equal to the latency threshold value LTV of the set compute namespace CNS, the queue control engine 520 stores the execute command EC2 in the command queue 510.

Next, when the execute command EC3 is received from the host device 20, the queue control engine 520 calculates a predicted processing time PPT required for the accelerator to process computing based on the execute command EC3. In this regard, the predicted processing time PPT may be calculated as c. In this regard, since the execute commands EC1 and EC2 are already stored in the command queue 510, the cumulative processing time APT of the command queue 510 is a+b+c. If a+b+c is smaller than or equal to the latency threshold value LTV of the set compute namespace CNS, the queue control engine 520 stores the execute command EC3 in the command queue 510.

Next, when the execute command EC4 is received from the host device 20, the queue control engine 520 calculates a predicted processing time PPT required for the accelerator to process computing based on the execute command EC4. In this regard, the predicted processing time PPT may be calculated as d. In this regard, since the execute commands EC1, EC2, and EC3 are already stored in the command queue 510, the cumulative processing time APT of the command queue 510 is a+b+c+d. In this regard, if a+b+c+d exceeds the latency threshold value LTV of the set compute namespace CNS, the queue control engine 520 determines that there is a latency problem. Then, in response to this determination, the storage controller 200 sends the latency message as described above to the host device 20.

In some embodiments, these execute commands may be execute commands defined in an NVMe TP 4091 Computational Programs Command Set Specification. For example, the execute commands may include commands for instructing compressing, decompressing, encrypting, decrypting, or filtering the data stored in the non-volatile memory (400 in FIG. 1). However, embodiments are not limited thereto.

In some embodiments, when the execute command stored in the command queue 510 is being processed by the accelerator, the queue control engine 520 may determine whether there is a latency problem, based on a residual time required for the accelerator to complete computing based on the execute command.

Figure 10:
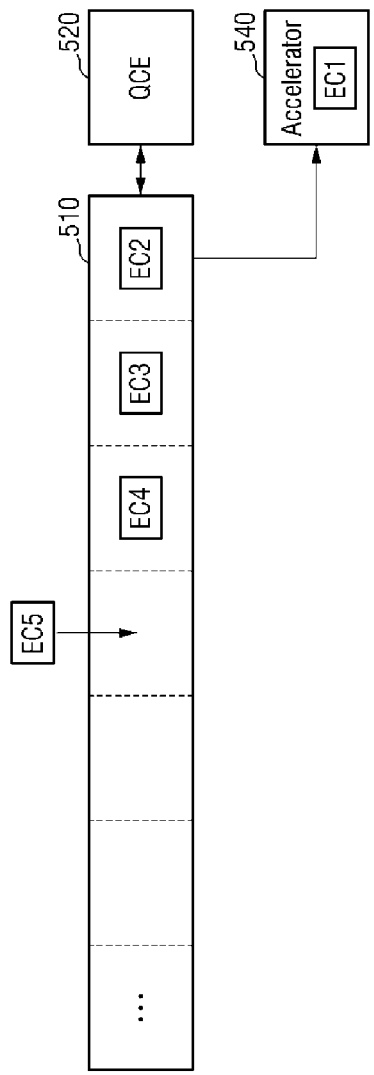

For example, referring to FIG. 10, in a situation where the execute commands EC2, EC3, and EC4 are stored in the command queue 510 and the accelerator 540 is processing the computing based on the execute command EC1, the storage controller 200 receives an execute command EC5 from the host device 20. In response to the reception, the queue control engine 520 may calculate a residue time required for the accelerator 540 to complete the computing based on the execute command EC1 (the residue time may be, for example, smaller than a in FIG. 9). Then, the queue control engine 520 may sum the residue time and predicted processing times PPT respectively related to the execute commands EC2, EC3, EC4, and EC5 with each other to calculate the cumulative processing time APT of the command queue 510.

Then, if the calculated cumulative processing time APT of the command queue 510 exceeds the latency threshold value LTV of the set compute namespace CNS, the queue control engine 520 may determine that there is a latency problem. Then, in response to this determination, the storage controller 200 may send the latency message as described above to the host device 20.

Hereinafter, with reference to FIG. 11 to FIG. 13, an operation of a memory system according to further some embodiments will be described.

Figure 11:
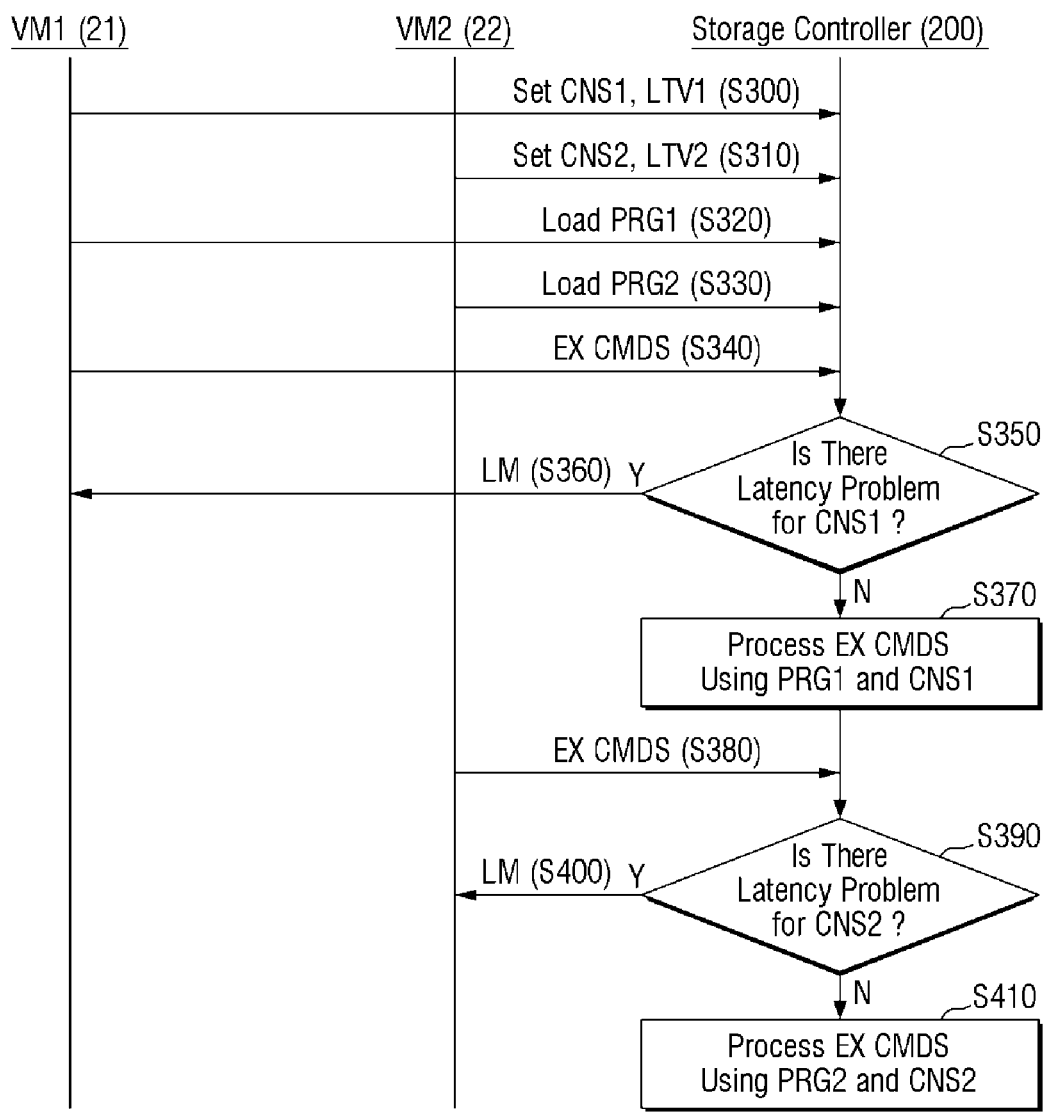
FIG. 11 is a flowchart illustrating an operation of a memory system according to some embodiments.

FIG. 11 is a flowchart illustrating an operation of a memory system according to some embodiments.

Figure 12:
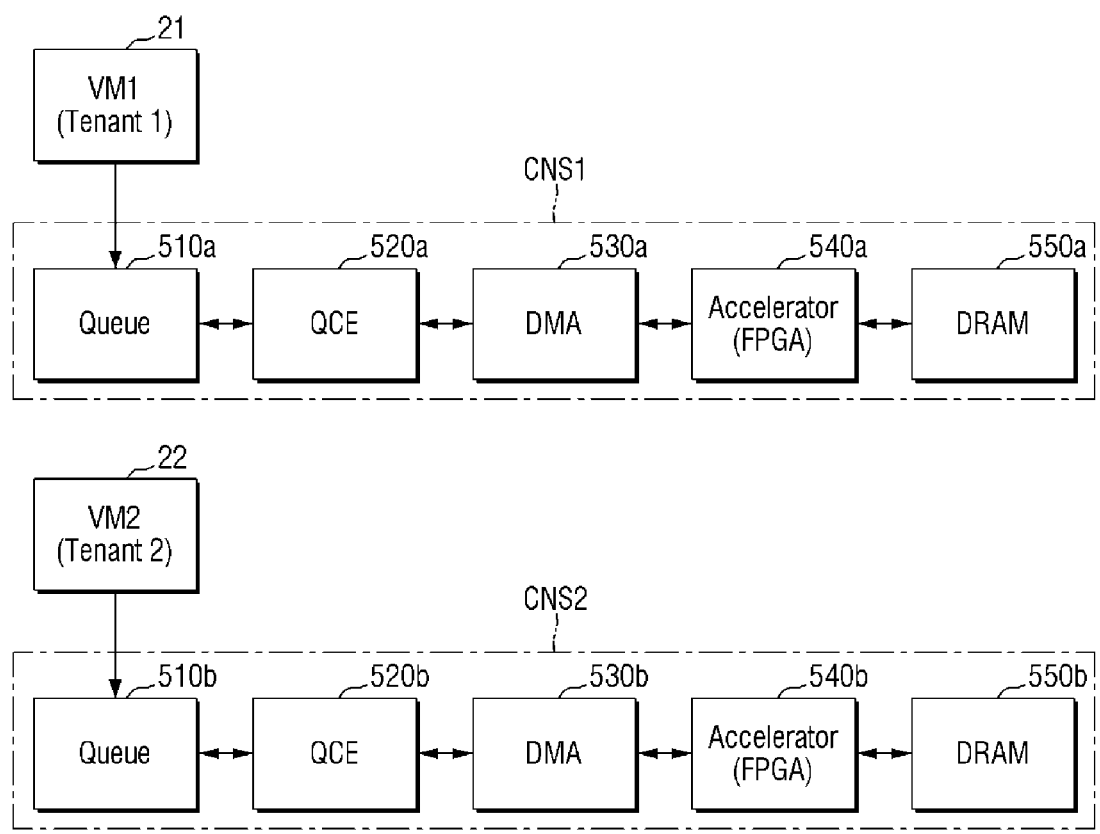
FIG. 12 and FIG. 13 are diagrams for illustrating an operation of the memory system shown in FIG. 11.
Figure 13:
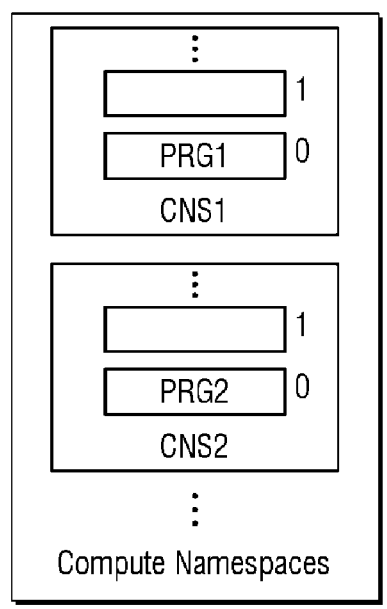

FIG. 12 and FIG. 13 are diagrams for illustrating an operation of the memory system as shown in FIG. 11.

In this embodiment, the host device may include a first virtual machine 21 and a second virtual machine 22. That is, in this embodiment, each of the virtual machines 21 and 22 may serve as a host device.

Referring to FIG. 11, the first virtual machine 21 associated with a first tenant transmits, to the storage controller 200, a setting instruction that instructs the setting of a first compute namespace CNS1 to process a command of the first virtual machine 21 and a first latency threshold value LTV1 related to the first compute namespace CNS1 in S300.

Referring to FIG. 12, upon receiving the setting instruction, the storage controller 200 sets the first compute namespace CNS1 to process the command of the first virtual machine 21 in the storage device 10. In some embodiments, the first compute namespace CNS1 may include a command queue 510a, a queue control engine 520a, a DMA engine 530a, an accelerator 540a, and a buffer memory 550a.

In this regard, the command queue 510a stores therein execute commands provided from the first virtual machine 21. Components of the first compute namespace CNS1 are used to process the execute commands received from the first virtual machine 21.

Next, referring to FIG. 11, upon completing the setting of the first compute namespace CNS1, the storage controller 200 informs the first virtual machine 21 that the setting of the first compute namespace CNS1 has been completed. An operation in which the storage controller 200 sets the first compute namespace and an operation in which the storage controller 200 transmits a response signal indicating the completion of the setting may refer to those as described above with reference to FIG. 5. Thus, in FIG. 11, a detailed illustration thereof is omitted for simplicity of the description. Further, a detailed illustration of operations that may be sufficiently inferred from the descriptions made above with reference to FIG. 5 is omitted from FIG. 11.

Next, the second virtual machine 22 associated with a second tenant transmits, to the storage controller 200, a setting instruction instructing the setting of a second compute namespace CNS2 to process a command of the second virtual machine 22 and a second latency threshold value LTV2 related to the second compute namespace CNS2 in S310.

Referring to FIG. 12, upon receiving the setting instruction, the storage controller 200 sets the second compute namespace CNS2 to process the command of the second virtual machine 22 in the storage device 10. In some embodiments, the second compute namespace CNS2 may include a command queue 510b, a queue control engine 520b, a DMA engine 530b, an accelerator 540b, and a buffer memory 550b.

In this regard, the command queue 510b stores therein execute commands provided from the second virtual machine 22. Components of the second compute namespace CNS2 are used to process the execute commands received from the second virtual machine 22.

Next, referring to FIG. 11, upon completing the setting of the second compute namespace CNS2, the storage controller 200 informs the second virtual machine 22 that the setting of the second compute namespace CNS2 has been completed.

Next, the first virtual machine 21 instructs the storage controller 200 to load a first program to be used in the first compute namespace CNS1 in S320. Then, the second virtual machine 22 instructs the storage controller 200 to load a second program to be used in the set second compute namespace CNS2 in S330.

For example, referring to FIG. 13, the first virtual machine 21 instructs the storage controller 200 to load the first program PRG1 into a slot #0 of the first compute namespace CNS1. In response to the instruction, the storage controller 200 loads the first program PRG1 into the slot #0 of the first compute namespace CNS1 and informs the first virtual machine 21 that the loading of the first program PRG1 has been completed.

Then, the second virtual machine 22 instructs the storage controller 200 to load the second program PRG2 into a slot #0 of the second compute namespace CNS2. In response to the instruction, the storage controller 200 loads the second program PRG2 into the slot #0 of the second compute namespace CNS2 and informs the second virtual machine 22 that the loading of the second program PRG2 has been completed.

Referring to FIG. 11, each of the first and second virtual machines 21 and 22 activates the loaded program. Then, the first virtual machine 21 transmits execute commands using the activated first program to the storage controller 200 in S340. Then, the storage controller 200 identifies whether there is a latency problem in processing computing based on the received execute commands in S350. If it is determined that the computing based on the received execute commands cannot be processed within the first latency threshold value LTV1 (S350-Y), the storage controller 200 transmits the latency message to the first virtual machine 21 in S360.

If it is determined that the computing based on the received execute commands can be processed within the first latency threshold value LTV1 (S350-N), the storage controller 200 processes the computing based on the execute commands using the activated first program and the set first compute namespace in S370. Then, the storage controller 200 informs the first virtual machine 21 that the processing of the computing based on the received execute commands has been completed. Detailed operations thereof have been described above, and thus a duplicate description thereof is omitted.

Next, the second virtual machine 22 transmits execute commands using the activated second program to the storage controller 200 in S380. Then, the storage controller 200 identifies whether there is a latency problem in processing computing based on the received execute commands in S390. If it is determined that the computing based on the received execute commands cannot be processed within the second latency threshold value LTV2 (S390-Y), the storage controller 200 transmits the latency message to the second virtual machine 22 in S400.

If it is determined that the computing based on the received execute commands can be processed within the second latency threshold value LTV2 (S390-N), the storage controller 200 processes the computing based on the execute commands using the activated second program and the set second compute namespace in S410. Then, the storage controller 200 informs the second virtual machine 22 that the processing of the computing based on the received execute commands has been completed.

Hereinafter, with reference to FIG. 14 to FIG. 17, an operation of a memory system according to still further some embodiments will be described.

Figure 14:
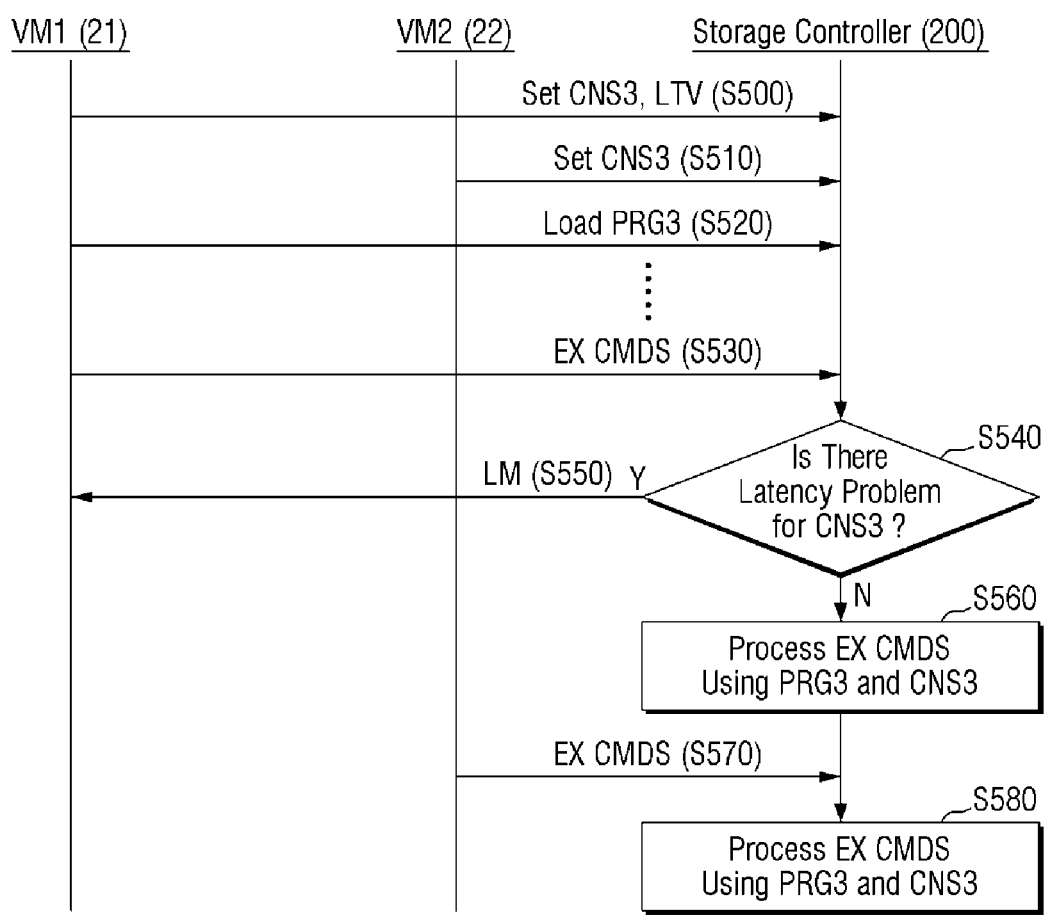
FIG. 14 is a flowchart illustrating an operation of a memory system according to some embodiments.
Figure 15:
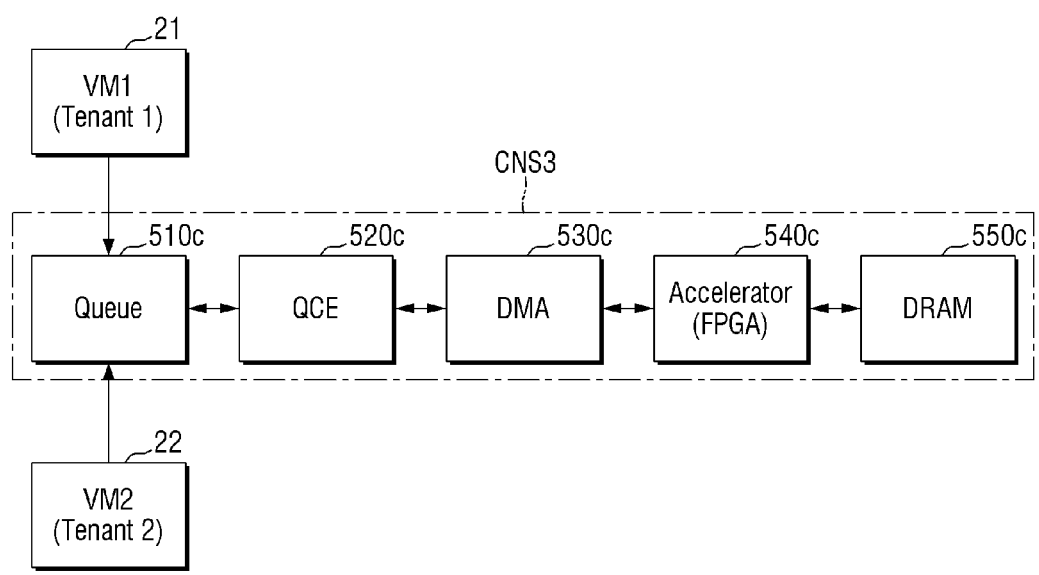
FIG. 15 to FIG. 17 are diagrams for illustrating an operation of a memory system shown in FIG. 14.
Figure 16:
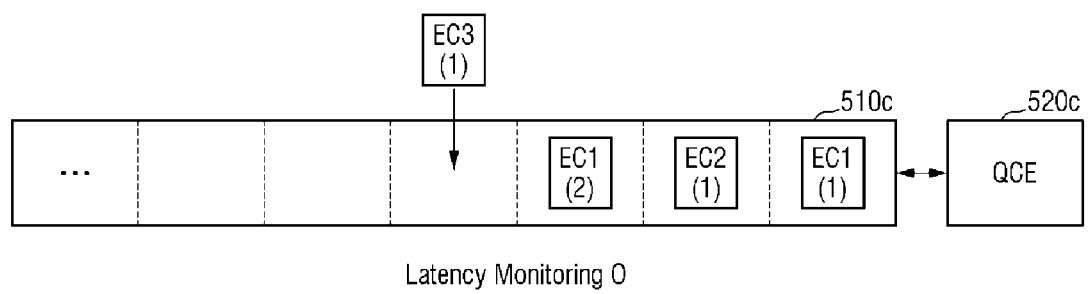
Figure 17:
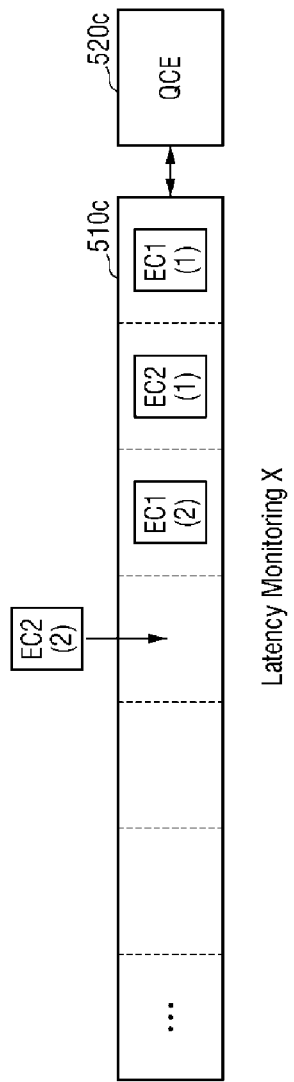

FIG. 14 is a flowchart illustrating an operation of a memory system according to some embodiments. FIG. 15 to FIG. 17 are diagrams for illustrating an operation of the memory system as shown in FIG. 14. In FIG. 14, detailed illustrations of operations duplicate with the above-described operations are omitted.

Referring to FIG. 14, the first virtual machine 21 associated with the first tenant transmits, to the storage controller 200, a setting instruction instructing the setting of a third compute namespace CNS3 to process a command of the first virtual machine 21 and a latency threshold value LTV related to the third compute namespace CNS3 in S500.

Referring to FIG. 15, upon receiving the setting instruction, the storage controller 200 sets the third compute namespace CNS3 to process the command of the first virtual machine 21 in the storage device 10. In some embodiments, the third compute namespace CNS3 may include a command queue 510c, a queue control engine 520c, a DMA engine 530c, an accelerator 540c, and a buffer memory 550c.

Next, referring to FIG. 14, the second virtual machine 22 associated with the second tenant sends, to the storage controller 200, a setting instruction instructing the setting of the third compute namespace CNS3 to process a command of the second virtual machine 22 in S510. That is, in this embodiment, different virtual machines use the same compute namespace in the storage device 10. Then, since the second virtual machine 22 does not perform a latency-sensitive task, the second virtual machine 22 does not set the latency threshold value in the third compute namespace CNS3 in the story device 10.

Referring to FIG. 15, upon receiving the setting instruction, the storage controller 200 sets the third compute namespace CNS3 so that the third compute namespace CNS3 may process computing based on the execute command received from the second virtual machine 22.

In this regard, the command queue 510c stores therein execute commands provided from the first virtual machine 21 and execute commands provided from the second virtual machine 22. Components of the third compute namespace CNS3 are used to process the execute commands received from the first virtual machine 21 and the execute commands received from the second virtual machine 22.

Next, referring to FIG. 14, the first virtual machine 21 instructs the storage controller 200 to load a third program to be used in the set third compute namespace CNS3 in S520. Although the drawing shows an operation in which the first virtual machine 21 instructs the storage controller 200 to load the third program to be used in the set third compute namespace CNS3, the second virtual machine 22 instead of the first virtual machine 21 may instruct the same operation.

Subsequently, the first virtual machine 21 may instruct the storage controller 200 to activate the third program loaded in the third compute namespace CNS3. In this regard, instead of the first virtual machine 21, the second virtual machine 22 may instruct the same operation.

Next, the first virtual machine 21 transmits execute commands using the activated third program to the storage controller 200 in S530. Since the first virtual machine 21 has set the latency threshold value LTV related to the third compute namespace, the storage controller 200 identifies whether there is a latency problem in processing computing based on the received execute commands in S540. If it is determined that the computing based on the received execute command cannot be processed within the latency threshold value LTV (S540-Y), the storage controller 200 transmits the latency message to the first virtual machine 21 in S550.

If it is determined that the computing based on the received execute command can be processed within the latency threshold value LTV (S540-N), the storage controller 200 processes the computing based on the execute commands using the activated third program and the set third compute namespace in S560. Then, the storage controller 200 informs the first virtual machine 21 that the processing of the computing based on the received execute commands has been completed.

Next, the second virtual machine 22 transmits execute commands using the activated third program to the storage controller 200 in S570. Because the second virtual machine 22 does not set the latency threshold value LTV related to the third compute namespace, the storage controller 200 does not identify whether there is a latency problem in processing computing based on the received execute commands Therefore, the storage controller 200 processes the computing based on the execute commands using the activated third program and the set third compute namespace in S580. Then, the storage controller 200 informs the second virtual machine 22 that the processing of the computing based on the received execute commands has been completed.

This operation is described in more detail with reference to FIG. 16 and FIG. 17 as follows.

First, referring to FIG. 16, in a state in which execute commands EC1(1) and EC2(1) received from the first virtual machine and an execute command EC1(2) received from the second virtual machine are stored in the command queue 510c, a new execute command EC3(1) is received from the first virtual machine. Upon the reception, the queue control engine 520c performs a monitoring operation (S540 of FIG. 14) of a latency related to the execute command EC3(1).

However, as shown in FIG. 17, in a state in which the execute commands EC1(1) and EC2(1) received from the first virtual machine and the execute command EC1(2) received from the second virtual machine are stored in the command queue 510c, a new execute command EC2(2) is received from the second virtual machine. Upon the reception, the queue control engine 520c determines that the execute command EC2(2) is a task insensitive to a latency and, thus, does not perform a monitoring operation of a latency related to the execute command EC2(2).

An example in which the first virtual machine 21 performs a latency-sensitive task and thus sets a latency threshold value in the compute namespace, whereas the second virtual machine 22 performs a latency-insensitive task and thus does not set a latency threshold value in the compute namespace has been described above. Embodiments of the present disclosure are not limited thereto.

In some embodiments, each of the first virtual machine 21 and the second virtual machine 22 may perform a latency-sensitive task and thus may set each latency threshold value in a shared compute namespace. In this case, the queue control engine 520c may perform monitoring of a latency related to the execute command received from the first virtual machine 21, based on a latency threshold value set by the first virtual machine 21. The queue control engine 520c may perform monitoring of a latency related to the execute command received from the second virtual machine 22, based on a latency threshold value set by the second virtual machine 22.

In this embodiment, the latency threshold value related to the compute namespace in the storage device may be set per each host device (or virtual machine). When a processing time of the computing based on the execute command exceeds the latency threshold value, this event may be informed to the host device (or virtual machine). Accordingly, the host device (or virtual machine) may perform a subsequent operation necessary for latency control.

Therefore, the latency related to computing execution may be controlled in an environment where a plurality of host devices (or virtual machines) competitively use the compute namespace in the storage device.

Figure 18:
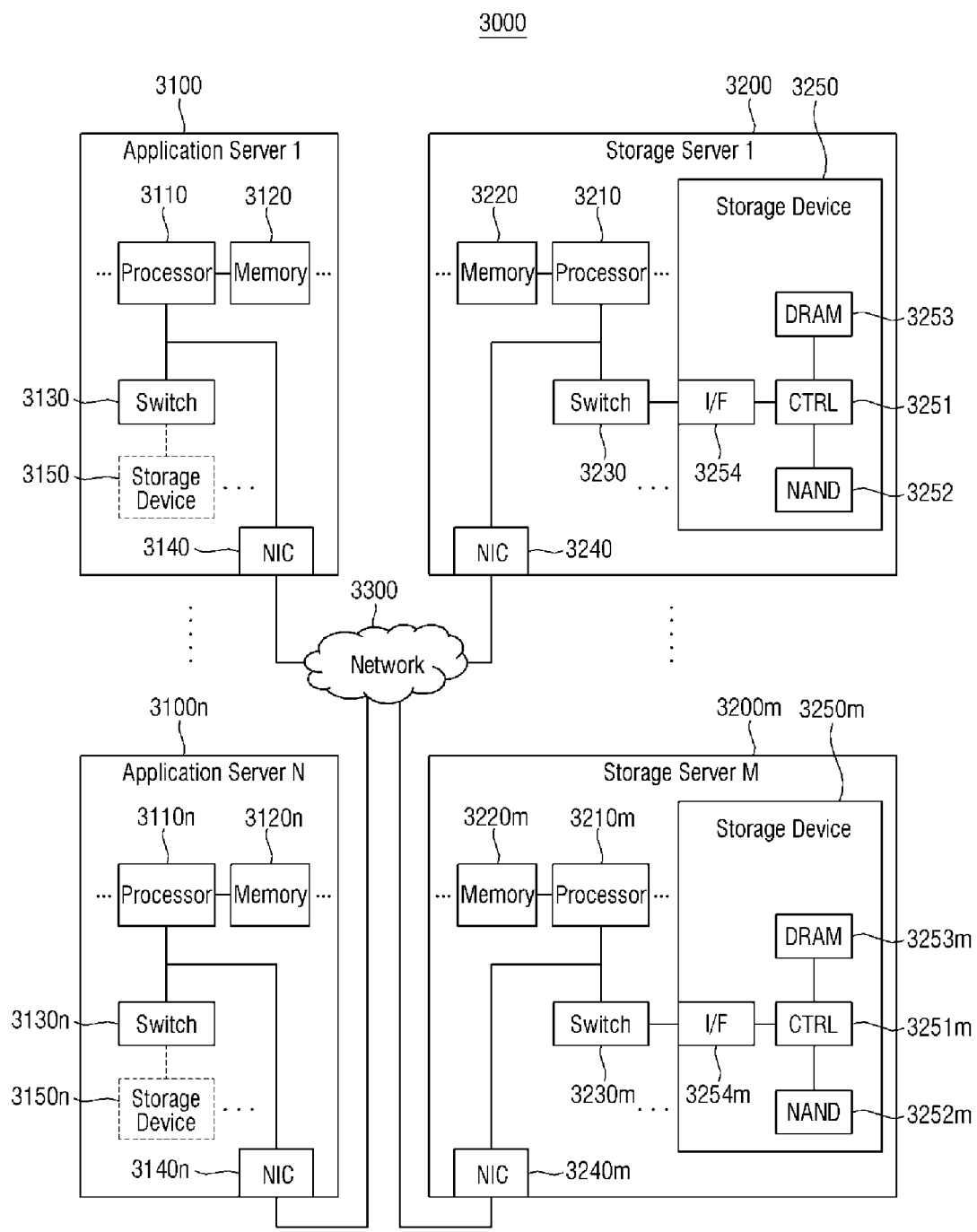
FIG. 18 is a diagram of a data center including a storage device according to some embodiments.

FIG. 18 is a diagram of a data center including a storage device according to some embodiments.

Referring to FIG. 18, the data center 3000 may be a facility that collects various data and provides services and may be referred to as a data storage center. The data center 3000 may be a system for operating a search engine and database or may be a computing system used in a business such as a bank or a government institution. The data center 3000 may include application servers 3100 to 3100n and storage servers 3200 to 3200m. The number of the application servers 3100 to 3100n and the number of the storage servers 3200 to 3200m may be variously selected according to embodiments. The number of the application servers 3100 to 3100n and the number of the storage servers 3200 to 3200m may be different from each other.

The application server 3100 or the storage server 3200 may include at least one of a processor 3110 or 3210 and a memory 3120 or 3220. A configuration of the storage server 3200 will be described by way of example. In this connection, the processor 3210 may control overall operations of the storage server 3200 and may access the memory 3220 to execute instructions and/or data loaded into the memory 3220. The memory 3220 may include DDR SDRAM (Double Data Rate Synchronous DRAM), HBM (High Bandwidth Memory), HMC (Hybrid Memory Cube), DIMM (Dual In-line Memory Module), Optane DIMM, and/or NVMDIMM (Non-Volatile DIMM). According to the embodiment, the number of the processors 3210 and the number of the memories 3220 included in the storage server 3200 may be variously selected. In one embodiment, the processor 3210 and the memory 3220 may provide a processor-memory pair. In one embodiment, the number of the processors 3210 and the number of the memories 3220 may be different from each other. The processor 3210 may include a single core processor or a multi-core processor. The above descriptions of the storage server 3200 may be similarly applied to the application server 3100. According to the embodiment, the application server 3100 may not include a storage device 3150. The storage server 3200 may include at least one storage device 3250. The number of the storage devices 3250 included in the storage server 3200 may be variously selected according to embodiments.

In some embodiments, the storage device 3250 may include the storage device 10 as described above with reference to FIG. 1 to FIG. 17. That is, when the storage device 3250 may receive an execute command from each of a plurality of host devices (or a plurality of virtual machines) and perform computing according thereto, the storage device 3250 may perform latency control.

The application servers 3100 to 3100n and the storage servers 3200 to 3200m may communicate with each other over a network 3300. The network 3300 may be implemented using FC (Fiber Channel) or Ethernet. In this connection, FC may be a medium used for relatively high-speed data transmission and may use an optical switch that provides high performance/high availability. Depending on an access scheme of the network 3300, the storage servers 3200 to 3200m may be embodied as file storage, block storage, or object storage.

In one embodiment, the network 3300 may be embodied as a storage dedicated network such as an SAN (Storage Area Network). For example, the SAN may be an FC-SAN that uses an FC network and is implemented according to an FCP FC Protocol. In another example, the SAN may be an IP-SAN that uses a TCP/IP network and is implemented according to an iSCSI (SCSI over TCP/IP or Internet SCSI) protocol. In another embodiment, the network 3300 may be a general network such as a TCP/IP network. For example, the network 3300 may be implemented according to protocols such as FCoE (FC over Ethernet), NAS (Network Attached Storage), and NVMe-oF (NVMe over Fabrics).

Hereinafter, descriptions will be focused on the application server 3100 and the storage server 3200. The descriptions of the application server 3100 may be equally applied to other application servers 3100*n*. The descriptions of the storage server 3200 may be equally applied to other storage servers 3200*m*.

The application server 3100 may store data in one of the storage servers 3200 to 3200*m* via the network 3300 upon receiving a request from a user or a client to store the data. Further, the application server 3100 may acquire data from one of the storage servers 3200 to 3200*m* via the network 3300 upon receiving a request from a user or a client to read the data. For example, the application server 3100 may be implemented as a web server or DBMS (Database Management System).

The application server 3100 may access the memory 3120*n* or the storage device 3150*n* included in another application server 3100*n* via the network 3300. Alternatively, the application server 3100 may access memories 3220 to 3220*m* or the storage devices 3250 to 3250*m* included in the storage server 3200 to 3200*m* via the network 3300. Accordingly, the application server 3100 may perform various operations on data stored in the application servers 3100 to 3100*n* and/or the storage servers 3200 to 3200*m*. For example, the application server 3100 may execute instructions for moving or copying data between the application servers 3100 to 3100*n* and/or the storage servers 3200 to 3200*m*. At this time, data may flow from the storage devices 3250 to 3250*m* of the storage servers 3200 to 3200*m* through the memories 3220 to 3220*m* of the storage servers 3200 to 3200*m* to the memories 3120 to 3120*n* of the application servers 3100 to 3100*n* or may be directly delivered from the storage devices 3250 to 3250*m* of the storage servers 3200 to 3200*m* to the memories 3120 to 3120*n* of the application servers 3100 to 3100*n*. The data flowing over the network 3300 may be encrypted data for security or privacy.

The storage server 3200 is described by way of example. An interface 3254 may provide a physical connection between the processor 3210 and a controller 3251 and a physical connection between an NIC (Network Interconnect) 3240 and the controller 3251. For example, the interface 3254 may be implemented in a DAS (Direct Attached Storage) scheme in which the storage device 3250 is directly connected to a dedicated cable. Further, for example, the interface 3254 may be implemented in various interface schemes such as ATA (Advanced Technology Attachment), SATA (Serial ATA), e-SATA (external SATA), SCSI (Small Computer Small Interface), SAS (Serial Attached SCSI), PCI (Peripheral Component Interconnection), PCIe (PCI express), NVMe (NVM express), IEEE 1394, USB (universal serial bus), SD (secure digital) card, MMC (multi-media card), eMMC (embedded multi-media card), UFS (Universal Flash Storage), eUFS (embedded Universal Flash Storage), and/or CF (compact flash) card interface, etc.

The storage server 3200 may further include a switch 3230 and the NIC 3240. The switch 3230 may selectively connect the processor 3210 and the storage device 3250 to each other or selectively connect the NIC 3240 and the storage device 3250 to each other under control of the processor 3210.

In one embodiment, the NIC 3240 may include a network interface card, a network adapter, and the like. The NIC 3240 may be connected to the network 3300 via a wired interface, a wireless interface, a Bluetooth interface, or an optical interface. The NIC 3240 may include an internal memory, a DSP (digital signal processor), a host bus interface, etc., and may be connected to the processor 3210 and/or the switch 3230 via the host bus interface. The host bus interface may be implemented as one of the examples of the interface 3254 as described above. In one embodiment, the NIC 3240 may be integrated with at least one of the processor 3210, the switch 3230, and the storage device 3250. Switches 3130, 3130*n*, and 3230*m* operate similarly to switch 3230. NICs 3140, 3140*n*, and 3240*m* operate similarly to NIC 3240.

In the storage servers 3200 to 3200*m* or the application servers 3100 to 3100*n*, the processor may transmit a command to the storage devices 3150 to 3150*n* and 3250 to 3250*m* or the memories 3120 to 3120*n* and 3220 to 3220*m* to program or read data thereto or therefrom. In this case, the data may be data error-corrected via the ECC (Error Correction Code) engine. The data may be data subjected to DBI (Data Bus Inversion) or DM (Data Masking) and may include CRC (Cyclic Redundancy Code) information. The data may be encrypted data for security or privacy.

The storage devices 3150 to 3150*n* and 3250 to 3250*m* may transmit a control signal and a command/address signal to the NAND flash memory devices 3252 to 3252*m* in response to a read command received from the processor. Accordingly, when the data is read-out from the NAND flash memory devices 3252 to 3252*m*, a RE (Read Enable) signal may be input as a data output control signal to allow the data to be output to a DQ bus. A DQS (Data Strobe) may be generated using the RE signal. The command and address signals may be latched into the page buffer according to a rising edge or a falling edge of the WE (Write Enable) signal.

The controller 3251 may control overall operations of the storage device 3250. In one embodiment, the controller 3251 may include SRAM (Static Random Access Memory). The controller 3251 may write data to the NAND flash 3252 in response to a write-in command. Alternatively, the controller 3251 may read-out data from the NAND flash 3252 in response to a read-out command. For example, the write-in command and/or the read-out command may be provided from the processor 3210 in the storage server 3200, the processor 3210*m* in another storage server 3200*m*, or the processor 3110 or 3110*n* in the application server 3100 or 3100*n*.

A DRAM 3253 may temporarily store (buffer) therein data to be written to the NAND flash 3252 or data read-out from the NAND flash 3252. Further, the DRAM 3253 may store therein meta data. In this connection, the meta data may be user data or data generated by the controller 3251 to manage the NAND flash 3252. The storage device 3250 may include SE (Secure Element) for security or privacy.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are not restrictive but illustrative in all respects.

What is claimed is:

1. A method for operating a computational storage device comprising a storage controller, the method comprising:
   receiving, by the storage controller and from a first host device, a first compute namespace setting instruction establishing a first compute namespace, a first latency threshold value related to the first compute namespace, a first program, a first execute command;
   loading, by the storage controller, the first program into the first computer namespace;
   activating, by the storage controller, the first program;
   receiving, by the storage controller and from the first host device, a second execute command;
   identifying, by the storage controller, a latency associated with the second execute command; and
   transmitting, by the storage controller and to the first host device, a first latency message based on execution of the second execute command.

2. The method of claim 1, further comprising:
   storing, by the storage controller, the first execute command in a first command queue; and
   in response to a latency-related state being:
      a first state while storing the second execute command in the first command queue, storing by the storage controller the second execute command in the first command queue, and
      a second state while storing the second execute command in the first command queue, transmitting by the storage controller the first latency message to the first host device.

3. The method of claim 2, wherein:
   the first state is a state in which a sum is equal to or smaller than the first latency threshold value, the sum acquired by adding:
      a first processing time required to process a first computing based on the first execute command using a first accelerator; and
      a second processing time required to process a second computing based on the second execute command using the first accelerator, and
      the second state is a state in which the sum is greater than the first latency threshold value.

4. The method of claim 1, further comprising:
   storing, by the storage controller, the first execute command in a first command queue;
   processing, by a first accelerator, a first computing based on the first execute command; and
   in response to a latency-related state being:
      a first state while storing the second execute command in the first command queue, storing by the storage controller the second execute command in the first command queue, and
      a second state while storing the second execute command in the first command queue, transmitting by the storage controller the first latency message to the first host device.

5. The method of claim 4, wherein:
   the first state is a state in which a sum is equal to or smaller than the first latency threshold value, the sum acquired by adding:
      a residue time required for the first accelerator to complete the first computing; and
      a processing time required for the first accelerator to process a second computing based on the second execute command, and
   the second state is a state in which the sum is greater than the first latency threshold value.

6. The method of claim 1, further comprising:
   receiving, by the storage controller and from a second host device, a second compute namespace setting instruction establishing a second compute namespace different from the first compute namespace setting instruction, a second latency threshold value related to the second compute namespace, a second program different from the first program, and a third execute command;
   loading, by the storage controller, the second program in to the second computer namespace;
   activating, by the storage controller, the second program;
   receiving, by the storage controller and from the second host device, a fourth execute command;
   identifying, by the storage controller, a latency associated with the fourth execute command; and
   transmitting, by the storage controller and to the second host device, a second latency message based on executing of the fourth execute command.

7. The method of claim 6, wherein:
   the first host device includes a first virtual machine related to a first tenant, and
   the second host device includes a second virtual machine related to a second tenant.

8. The method of claim 6, further comprising:
   storing, by the storage controller, the third execute command in a second command queue; and
   in response to a latency-related state being:
      a first state while storing the fourth execute command in the second command queue, storing by the storage controller the fourth execute command in the second command queue, and
      a second state while storing the fourth execute command in the second command queue, transmitting by the storage controller the second latency message to the second host device.

9. The method of claim 1, further comprising:
   receiving by the storage controller and from a second host device:
      the first compute namespace setting instruction, and
      a third execute command using the first program,
      wherein the storage controller does not transmit a latency message to the second host device in response to the third execute command.

10. The method of claim 9, further comprising:
    storing, by the storage controller, the first execute command in a first command queue;
    in response to a latency-related state being:

a first state while storing the second execute command in the first command queue, storing by the storage controller the second execute command in the first command queue, and a second state while storing the second execute command in the first command queue, transmitting by the storage controller the first latency message to the first host device; and storing, by the storage controller, the third execute command in the first command queue without determining whether the latency-related state is the first state or the second state.

11. The method of claim 1, further comprising:
receiving by the storage controller and from a second host device:
the first compute namespace setting instruction,
a second latency threshold value related to the first compute namespace, and
a third execute command using the first program; and
transmitting, by the storage controller and to the second host device, a second latency message in response to the third execute command.

12. The method of claim 11, further comprising:
storing, by the storage controller, the first execute command in a first command queue; and
in response to a latency-related state being:
a first state while storing the second execute command in the first command queue, storing by the storage controller the second execute command in the first command queue,
a second state while storing the second execute command in the first command queue, transmitting by the storage controller the first latency message to the first host device,
a third state while storing the third execute command in the first command queue, storing by the storage controller the third execute command in the first command queue, and
a fourth state while storing the third execute command in the first command queue, transmitting by the storage controller the second latency message to the second host device.

13. The method of claim 1, wherein the first compute namespace includes a command queue, a queue control engine, a DMA (Direct Memory Access) engine, an accelerator, and a buffer memory of the computational storage device.

14. The method of claim 1, wherein the first latency message is transmitted to the first host device in an AER (Asynchronous Error Reporting) scheme.

15. The method of claim 1, wherein the first latency message includes a message indicating a refusal to receive a new execute command.

16. A method for operating a host device including a first virtual machine, the method comprising:
transmitting, by the first virtual machine and to a storage device, a first setting instruction establishing a first compute namespace to process a command from the first virtual machine, a first latency threshold value related to the first compute namespace, a first program to be loaded into the first compute namespace, a first execute command;
loading, by the storage device and to the first compute namespace, the first program;
activating, by the storage device, the first program;
receiving, by the first virtual machine and from the storage device, a second execute command;
executing, by the storage device, the second execute command;
identifying, by the storage device, a latency associated with the second execute command; and
receiving, by the first virtual machine and from the storage device, a first latency message based on execution of the second execute command.

17. The method of claim 16,
wherein the host device further includes a second virtual machine,
wherein the method further comprises:
transmitting, by the second virtual machine and to the storage device, a second setting instruction establishing the first compute namespace to process a command from the second virtual machine; and
transmitting, by the second virtual machine and to the storage device, a third execute command using the first program, and
wherein the second virtual machine does not receive a latency message from the storage device in response to the third execute command.

18. The method of claim 16,
wherein the host device further includes a second virtual machine, and
wherein the method further comprises:
transmitting, by the second virtual machine and to the storage device, a second setting instruction establishing the first compute namespace to process a command from the second virtual machine, a second latency threshold value related to the first compute namespace, and a third execute command using the first program; and
receiving, by the second virtual machine and from the storage device, a second latency message in response to the third execute command.

* * * * *